March 3, 1970  D. C. LEEMING  3,498,267
APPARATUS FOR CONVEYING FOOD TO BIRDS
Filed Sept. 25, 1967  2 Sheets-Sheet 1

March 3, 1970   D. C. LEEMING   3,498,267
APPARATUS FOR CONVEYING FOOD TO BIRDS
Filed Sept. 25, 1967   2 Sheets-Sheet 2

United States Patent Office 3,498,267
Patented Mar. 3, 1970

3,498,267
APPARATUS FOR CONVEYING FOOD TO BIRDS
David Christopher Leeming, % Broiler Equipment Co.
Ltd., Winnall, Winchester, Hampshire, England
Filed Sept. 25, 1967, Ser. No. 670,098
Int. Cl. A01k 5/00
U.S. Cl. 119—61                                          9 Claims

ABSTRACT OF THE DISCLOSURE

Apparatus for conveying food to birds comprises a flat shiny conveyor belt comprising the moving base of a trough, means for depositing food on to the belt and a stop for closing the far end of the trough the stop acting to maintain the depth of food in the trough at a predetermined level, further movement of the belt resulting in a relative slipping action between the food and the belt. The return portion of the belt may be employed for collecting the birds' eggs and conveying them to an egg-collecting station.

---

This invention relates to apparatus for conveying food to birds comprising a trough member having stationary side walls, a first roller at one end of the trough member, a second roller at the other end of the trough member, a flexible flat conveyor belt passing around the first roller and along the trough member forming a base for the trough and around the second roller, means for rotating at least one of the rollers to move the belt longitudinally through the trough from the first roller to the second roller, a food supply having a discharge outlet located only a small distance above the belt near the beginning of the trough member, and a barrier located at the end of the trough member, which barrier is held rigidly between the sides of the trough member across the stream of food being carried by the belt so as to prevent flow of food past the barrier, the said belt having a flat shiny upper face providing less friction than the side walls of the trough whereby continued movement of the belt when a predetermined level of food is reached in the trough causes slipping action between the food and the belt until some food is removed from the trough by birds.

By way of example, two specific embodiments of conveying means in accordance with the invention will now be described with reference to the following diagrammatic drawings in which.

Each embodiment described below is suitable for conveying food to a large number of birds (e.g. poultry) housed in a row of cages 1. The conveying means may also be used for the collection of eggs from the row of cages.

Figure 1:
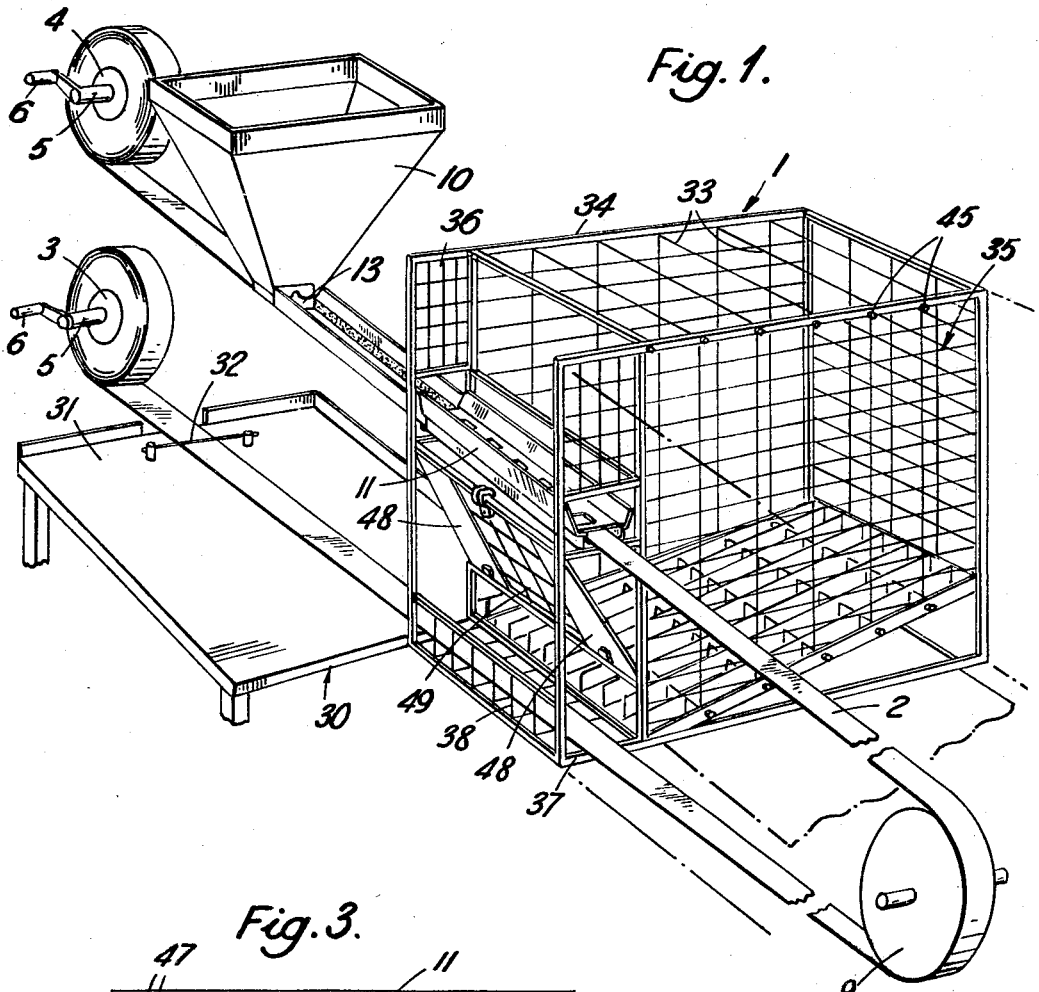
FIGURE 1 is a perspective view of the first embodiment, the figure showing the first bird cage only of a row of cages.
Figure 3:
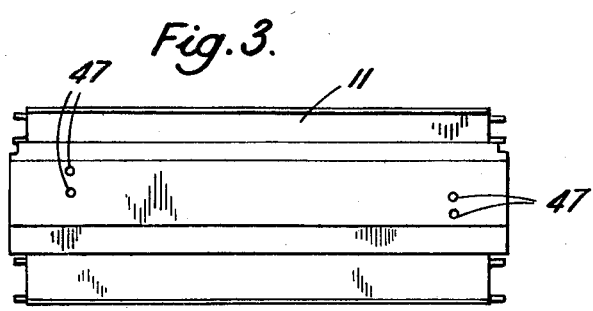
FIGURE 3 is an under-plan of the food trough shown in FIGURE 2.
Figure 2:
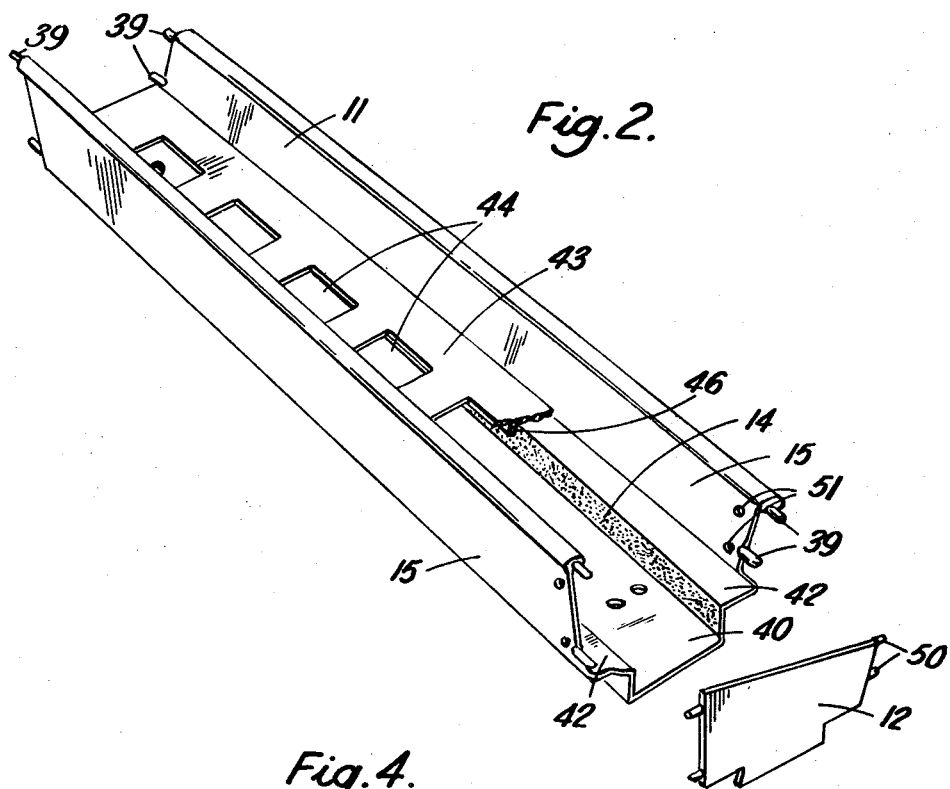
FIGURE 2 is an exploded view of the last section of the food trough forming a part of the conveying means shown in FIGURE 1, the figure showing the stop limiting the passage of the food beyond the end of the food trough.

With reference to FIGURE 1, each cage comprises a number of separate parts, each part being made of a plastics material and comprising lattice members 33 within a frame 34. The parts are secured together by pins on one of the members interlocking with sockets provided by the adjacent member. The first cage of the row of cages is shown in FIGURE 1 and each side member 35 of this cage is provided with sockets 45 for attachment thereto of the adjacent parts of the adjoining cage. Each side member also extends forwardly of the front of the cage. One purpose of these extending portions 36 is to support a feeding trough 11 located in front of the cages from which trough the birds may feed. The trough comprises a number of sections, the length of each section being equal to the width of each cage. Each section of the trough is also held in position by end pins 39 (see FIGURE 2) which are integral with the respective trough section and which interlock in sockets provided by the said extending portions 36 of the cage sides. The floor of each cage is also provided with an integral extending portion 37 having an upstanding end wall 38, the purpose of which extending portion will be described below.

The front side of the trough is higher than the back side (i.e. the side nearest to the cages) to avoid wastage of food by the birds during feeding. Also, in cross-section, the sides 15 of the trough are stepped inwardly at a point adjacent the base of the trough. The trough is thereby provided with a substantially central well or longitudinal recess 40 for reception of the food, which recess is spaced from the trough sides by shoulders 42. These shoulders 42 serve to support a food grid 43 having a series of apertures 44 through which the birds may reach the food in the recess 40 of the trough.

The grid 43 is also provided with integral longitudinal strengthening bars 46 projecting downwardly from the lower surface of the grid into the recess 40 (as shown) or projecting upwardly from the upper surface of the grid.

A food carrier 2 passes along this recess 40 of the trough and comprises a false bottom therefor. The carrier 2 is a flat shiny belt of plastics material and extends from a roller 4, around a roller 9 to a roller 3. The belt thereby comprises two portions of which the second portion, i.e. that portion extending between rollers 9 and 3, is a return portion which rests on the said extending portions 37 of the floors of the cages. This return portion may thereby be used for the collection and conveyance of eggs to an egg collecting station 30 adjacent the roller 3, the eggs being able to roll out of the front of the cages on to this second portion of the belt. The egg collecting station 30 comprises a table or surface 31 carrying a bar which extends transversely of and a small distance above the surface of the egg-carrying portion of the belt 2.

The base of the recess 40 of each section of the food trough is provided with two holes 47 adjacent each end whereby any food which may enter underneath the belt 2 may pass from the recess, since otherwise this food might cause a blockage which would disrupt the operation of the belt. These holes 47 are located above solid portions 48 of an inclined gate 49 provided in the front wall of the respective cage. These solid portions 48 thereby catch the food and avoid it being wasted. The gate 49 is hinged about its lower edge and its primary purpose is to allow for insertion of a bird into, or removal of a bird from the cage.

In this embodiment, the rollers 3 and 4 are located one above each other and beyond one end of the row of cages. Each roller 3, 4 is also provided with a central spindle 5 fitted with a cranked handle 6 for rotation thereof. The roller 9 is located beyond the other end of the row of cages.

The rollers 3 and 4 may be power-operated instead of hand-operated, e.g. by an electric motor. In such a case, the running time of the motor would be controlled by limit switches.

At the end of the belt 2 nearest the roller 4, there is a food hopper 10 through which food may be fed on to the belt by gravity or a screw conveyor. At the far end of the trough 11 from the hopper, there is a stop 12 (see FIGURE 2) to limit the travel of food along the belt. This stop comprises a solid barrier extending transversely of the recess 40 of the trough and is held in position by pins 50 projecting therefrom being inserted into holes or sockets 51 in the side walls 15 of the trough. Alternatively, the stop may be rivetted in position or secured to the side walls of the trough by adhesive. Sufficient clearance is provided beneath the stop to allow movement of the belt 2 but to prevent discharge of the food within the recess of the trough. Alternatively, the stop may be provided with a grommet having a slit through which the belt is passed.

It is also necessary to prevent the depth of food within the recess 40 of the trough 11 exceeding a certain level. This control is met, at least in part, by use of a shiny belt made of plastics materials having a low surface friction such as the material manufactured and sold by I.C.I. Limited under the trade name Mellinex. In addition to this, the depth of the food is controlled, in part, by a spring-loaded adjustable gate 13 located at the mouth of the hopper 10 and, in part, by the friction of the food against the sides 15 of the recess of the trough. This friction of the food against the sides 15 may be increased by making the inside surface 14 of the sides of the recess, rough or by applying thereto lengths of adhesive coated strip. It has been found that this combination of the stop 12, the Mellinex belt 2, the adjustable gate 13 and the rough side surfaces of the trough recess or the strips of adhesive applied thereto act to prevent the depth of food within the recess 40 increasing above a predetermined level. Thus, during operation of the apparatus by rotation of the roller 3 in a clockwise direction, as viewed in FIGURE 1, the food level within the recess of the trough will first be increased until it reaches the said predetermined level. This level of food will then be maintained by the belt merely slipping underneath the food, no more food being discharged from the hopper until some of the food is eaten by the birds. Further movement of the belt will then extract more food from the hopper until the level of the food in the recess is returned to the said predetermined level. Simultaneously, the lower portion of the belt will convey the eggs to the egg-collecting station. When the belt has been completely wound on to the roller 3, the belt is rewound on to the roller 4 by winding the respective handle 6 in a clockwise direction. The operation of conveying food to the birds and collecting their eggs may then be repeated.

Many modifications may be made to the details of the above described conveying means. For example the trough may only comprise the trough side 15, the sides being arranged such that the belt 2 forms the true bottom of the trough and not just a false bottom.

Figure 4:
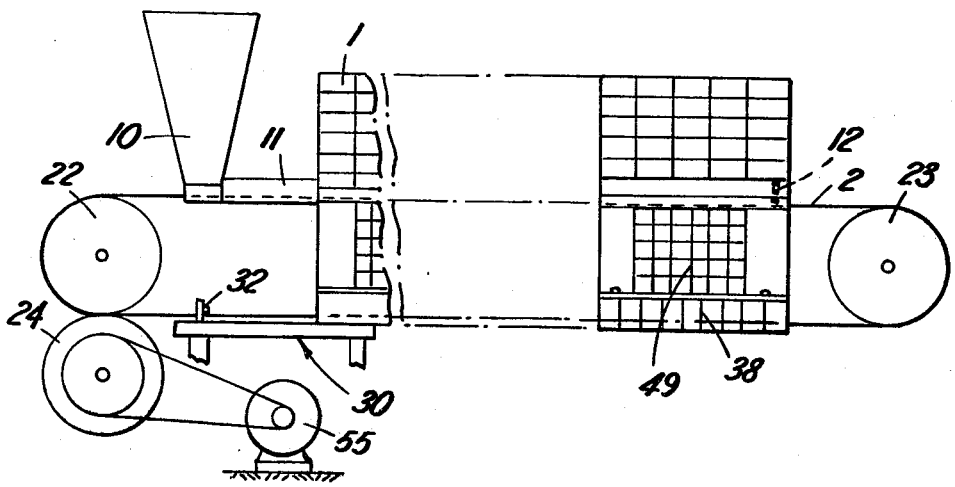
FIGURE 4 is a front elevation of the second embodiment, the figure showing the last bird cage only of a row of cages.

With reference to FIGURE 4, the second embodiment incorporates an endless carrier or belt 2 which extends between two rollers 22, 23 mounted one at either end of the trough 11, the belt being driven intermittently or continuously by means of a driven roller 24 which cooperates with the roller 22 to effect movement to the belt 2. Both the rollers 22, 24 are coated with rubber to increase their grip on the belt 2 passing therebetween. The roller 24 is driven by an electric motor 55. As before the running time of the motor may be controlled by limit switches.

Such form of conveying means may be used either for the supply of food alone or for the supply of food and the collection of eggs, the belt being driven through the trough from left to right as viewed in FIGURE 4. As in the first embodiment, the belt would convey the eggs to a collecting station 30 adjacent the roller 22.

The invention is not restricted to the details of the above embodiments. For example, if the distance between the rollers 3 and 9 or 22 and 23 is great, there may be provided more than one hopper 16 for supplying the recess of the trough with food.

Also, bird cages are often arranged in rows, back to back. In this case, a single food trough may be located between two rows of cages, i.e. adjacent the common back, or the backs, of the cages, instead of providing separate food troughs in front of each row of cages.

I claim:

1. Apparatus for conveying food to birds comprising a trough member having stationary side walls, a first roller at one end of the trough member, a second roller at the other end of the trough member, a flexible flat conveyor belt passing around the first roller and along the trough member forming a base for the trough and around the second roller, means for rotating at least one of the rollers to move the belt longitudinally through the trough from the first roller to the second roller, a food supply having a discharge outlet located ony a small distance above the belt near the beginning of the trough member, and a barrier located at the end of the trough member, which barrier is held rigidly between the sides of the trough member across the stream of food being carried by the belt so as to prevent flow of food past the barrier, the said belt having a flat shiny upper face providing less friction than the side walls of the trough constituting a means where continued movement of the belt when a predetermined level of food is reached in the trough causes slipping action between the food and the belt until some food is removed from the trough by birds.

2. Apparatus as claimed in claim 1 in which the said belt extends in a straight path between said first and second rollers and the food supply discharge outlet and barrier are both located between said first and second rollers at opposite ends of the trough member.

3. Apparatus as claimed in claim 1 in which the means for depositing the food on to the belt comprise a hopper having a discharge opening located a small distance above the belt.

4. Apparatus as claimed in claim 3 in which the predetermined level of food in the trough is controlled at least in part by an adjustable gate located at the discharge opening of the hopper.

5. Apparatus as claimed in claim 1 in which the side walls of the trough are rough.

6. Apparatus as claimed in claim 1 in which the apparatus is provided in combination with a row of bird cages, the food trough extending along the row of cages and being located so that the birds can remove food from the trough whilst remaining within their respective cages and the said belt for carrying the food having a first portion extending along the trough, the belt then passing around a roller and having a second portion extending back along the row of cages and serving as an egg conveyor for carrying eggs to an egg collecting station, the cages being constructed so that the eggs can roll out of the cages on to the said second portion of the belt.

7. Apparatus as claimed in claim 1 in which a grid is supported on the trough at a height just above the predetermined food level of the trough, which grid has holes through which the birds may reach the food in the trough.

8. Apparatus as claimed in claim 1 in which the trough has a fixed stationary base and in which the base of the trough is provided with holes spaced apart along its length to permit the escape of any food that may penetrate beneath the belt.

9. Apparatus as claimed in claim 2 in which the belt is an endless belt forming a closed loop.

References Cited

UNITED STATES PATENTS

| | | | |
|---|---|---|---|
| 1,617,339 | 2/1927 | McCollough | 119—61 |
| 2,197,160 | 4/1940 | Shuppner | 119—18 |
| 2,756,721 | 7/1956 | Hayes | 119—48 |
| 3,123,049 | 3/1964 | Cordis | 119—52 |
| 3,132,738 | 5/1964 | Engseth | 198—184 |
| 3,208,430 | 9/1965 | Ernst | 119—18 |
| 3,329,127 | 7/1967 | Cordis | 119—48 |
| 3,333,574 | 8/1967 | Harris | 119—51 |

ALDRICH F. MEDBERY, Primary Examiner

U.S. Cl. X.R.

119—18, 48